A. O. PATENAUDE.
STOVEPIPE.
APPLICATION FILED DEC. 18, 1916.

1,243,441.

Patented Oct. 16, 1917.

INVENTOR
AMABLE O. PATENAUDE

UNITED STATES PATENT OFFICE.

AMABLE OLIVER PATENAUDE, OF TIMMINS, ONTARIO, CANADA, ASSIGNOR OF ONE-HALF TO JOSEPH BERINI, OF TIMMINS, CANADA.

STOVEPIPE.

1,243,441.

Specification of Letters Patent. Patented Oct. 16, 1917.

Application filed December 18, 1916. Serial No. 137,724.

*To all whom it may concern:*

Be it known that I, AMABLE OLIVER PATENAUDE, of the village of Timmins, in the district of Temiskaming, in the Province of Ontario, Canada, have invented certain new and useful Improvements in Stovepipes, of which the following is the specification.

My invention relates to improvements in stove pipes and the object of the invention is to devise means for adjusting the length of the pipe without cutting any of the stove pipe sections and it consists essentially of a section having at one end a raised projection and an adjacent section having the end opposing the aforesaid section provided with parallel internal circumferential grooves and a longitudinal groove extending from the end of the section and from which one end of each circumferential groove extends as hereinafter more particularly explained by the following specification.

In the drawings like letters of reference indicate corresponding parts in the various figures.

Figure 4:
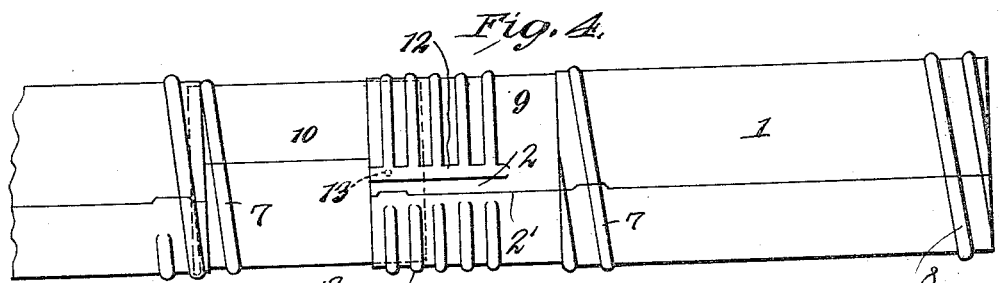
Fig. 4 shows the coupling in interlocking position.
Figure 1:
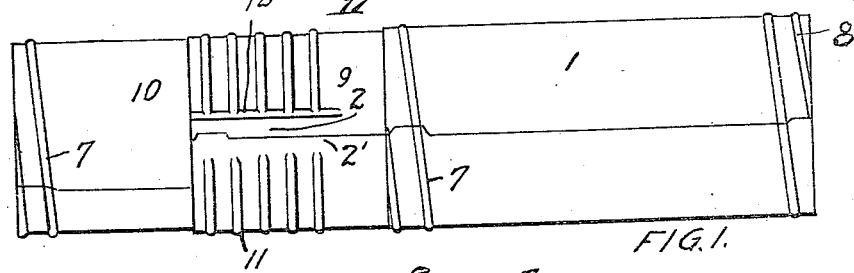
Figure 1, is a general elevation of a series of pipe sections connected together and showing my improvement.
Figure 2:
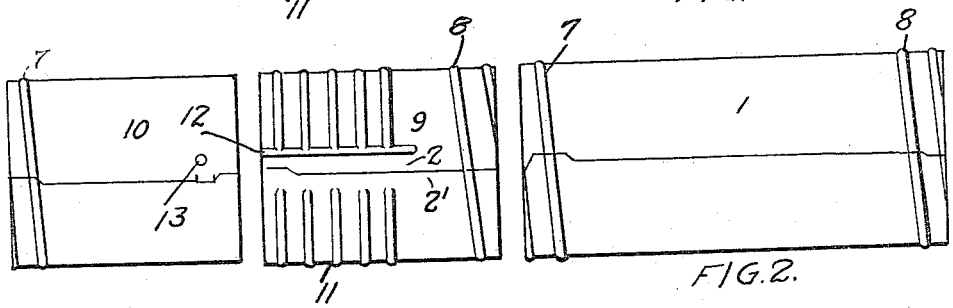
Fig. 2, is a general elevation of the sections shown in Fig. 1, separated.
Figure 3:
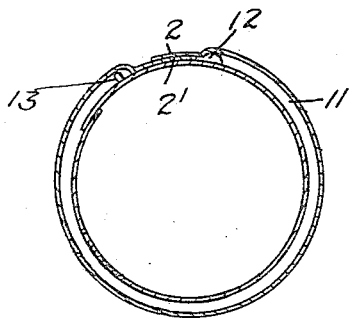
Fig. 3, is an enlarged cross section.

1, 9 and 10 indicate pipe sections. 7 indicates a male thread formed in one end of the pipe sections 1 and 10. 8 indicates a female thread formed in the opposite end of the pipe section 1 and corresponding end of the pipe section 9. 11 indicates a plurality of internal grooves extending circumferentially around the pipe section 9 into proximity to each edge portion 2 and 2' of such pipe section. 12 indicates a groove extending longitudinally from one end of the section 9 and from one side of which the grooves 11 extend.

It will be understood that all the pipe sections with the exception of sections 9 and 10 are formed similarly to the section 1.

When all the sections 1 are connected together in two groups, one group extending from each end of the space to be filled, an intervening space will be left between the approaching ends of the two pipe groups. In order to compensate for the variation of this space I have provided the sections 9 and 10 above described. When placing these in position one section 9 is attached to an end section 1 by screwing the thread 8 of the section 9 into the thread 7 of the section 1. The male thread 7 of the section 10 is then partially screwed into the female threaded end of the adjacent pipe section. The projection 13 is then passed into the longitudinal groove 2. The sections 9 and 10 are then drawn together until the pipe lengths have been brought to the required position when the section 10 is turned so that the projection 13 enters into one of the grooves 11. The pipe section 10 is then given a complete turn which completes the screwing of the thread 7 on to the thread 8 of the adjacent pipe section 1 and carries the projection 13 to the opposite end of the groove 11.

From this description it will be seen that I have devised a very simple means by which two pipe lengths, each comprising a series of sections may be drawn toward each other by an intervening section in opposite longitudinal directions so that each length may be drawn tight and thereby obviating the necessity of cutting a pipe section in order to provide a pipe length of a given longitudinal dimension.

What I claim as my invention is:

A device of the class described comprising in combination a coupling member, and stove pipe sections joined thereby, the coupling member comprising two sections joined by a bayonet joint and having their outer ends screw threaded and the adjacent ends of the stove pipe sections being correspondingly screw threaded, the screw threads of the coupling member sections and of the stove pipe sections bearing such relation to one another and to the bayonet joint that the rotation of the sections of the coupling member in coupling or uncoupling said sections are also coupling and uncoupling, respectively, said member and the stove pipe sections.

AMABLE OLIVER PATENAUDE.

Witnesses:
J. M. FORBES,
JOSEPH BERINI.

Copies of this patent may be obtained for five cents each, by addressing the "Commissioner of Patents. Washington, D. C."